(12) United States Patent
Claise et al.

(10) Patent No.: US 7,716,320 B2
(45) Date of Patent: May 11, 2010

(54) METHOD AND APPARATUS FOR PERSISTING SNMP MIB INTEGER INDEXES ACROSS MULTIPLE NETWORK ELEMENTS

(75) Inventors: Benoit Claise, Crisnèe (BE); Emmanuel Tychon, Fexhe-le-Haut-Clocher (BE); Richard Wellum, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 11/512,513

(22) Filed: Aug. 30, 2006

(65) Prior Publication Data

US 2008/0059620 A1    Mar. 6, 2008

(51) Int. Cl.
   G06F 15/177    (2006.01)
   G06F 15/173    (2006.01)
   G06F 15/16    (2006.01)

(52) U.S. Cl. ................. 709/223; 709/220; 709/230; 707/104.1

(58) Field of Classification Search ......... 709/223, 709/220, 230; 707/104.1
   See application file for complete search history.

(56) References Cited

U.S. PATENT DOCUMENTS

| | | | |
|---|---|---|---|
| 6,766,367 B1 | 7/2004 | Stevenson et al. | |
| 6,925,585 B1 | 8/2005 | Gopal | |
| 6,981,038 B2 | 12/2005 | McKenzie et al. | |
| 7,120,792 B1* | 10/2006 | Jacobson et al. | 713/153 |
| 7,420,988 B1* | 9/2008 | Grossman | 370/466 |
| 2003/0101240 A1* | 5/2003 | Courtney | 709/220 |
| 2004/0143654 A1* | 7/2004 | Poirot et al. | 709/223 |
| 2004/0153473 A1* | 8/2004 | Hutchinson et al. | 707/104.1 |

* cited by examiner

*Primary Examiner*—Quang N. Nguyen
*Assistant Examiner*—Ruolei Zong
(74) *Attorney, Agent, or Firm*—Michael C. Stephens, Jr.; Trellis IP Law Group, PC

(57) ABSTRACT

Disclosed are systems and methods for persisting management information indexes across multiple network elements. In particular, methods of detecting and curing potential collisions among a peer group of network elements by use of a hashing function can be provided in accordance with embodiments. For example, a method for maintaining persistence across network elements can include: (i) configuring one of the network elements, and providing a configuration string therefrom; (ii) performing a hashing algorithm on the configuration string to provide a hash value; (iii) determining if any collisions exists between the hash value and corresponding values from among a peer group of network elements; and (iv) assigning the hash value as a management table index when no collision is found, or assigning a new value for the management table index when a collision is found.

20 Claims, 3 Drawing Sheets

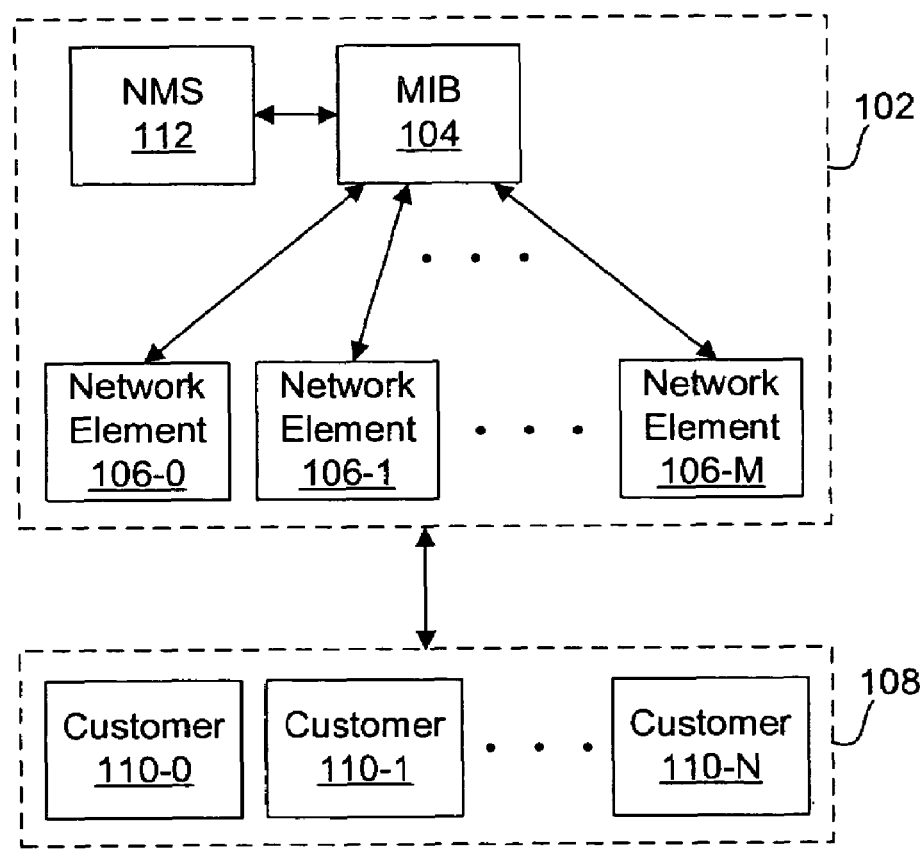
Figure 1 (conventional)

METHOD AND APPARATUS FOR PERSISTING SNMP MIB INTEGER INDEXES ACROSS MULTIPLE NETWORK ELEMENTS

FIELD OF THE INVENTION

Embodiments of the present invention relate in general to network elements and configurations thereof, and more specifically, to systems and methods for persisting management information indexes across multiple network elements.

BACKGROUND OF THE INVENTION

In typical network elements or devices (e.g., routers), data may be transferred and/or synchronized from an active side to a standby side using Stateful Switch Over (SSO). The process of ensuring that identical data is present in active and standby sides is called synchronization. In one such synchronization approach, Simple Network Management Protocol (SNMP) can allow exchange of management information among the network elements. SNMP is used in Quality of Service (QoS) data in popular Management Information Bases (MIBs), for example.

The MIB can assist customers in accessing Modular Quality of Service Configuration (QoSMQC) data and/or statistics. The QoSMQC data and statistics may be indexed by object identifiers (OIDs). However, where multiple remote devices exist on a network, potential hash value collisions can cause persistence problems for SSO and/or network element reloads.

BRIEF DESCRIPTION OF THE DRAWINGS

FIG. 1 depicts a conventional network element arrangement.

DETAILED DESCRIPTION OF EMBODIMENTS OF THE INVENTION

Figure 2:
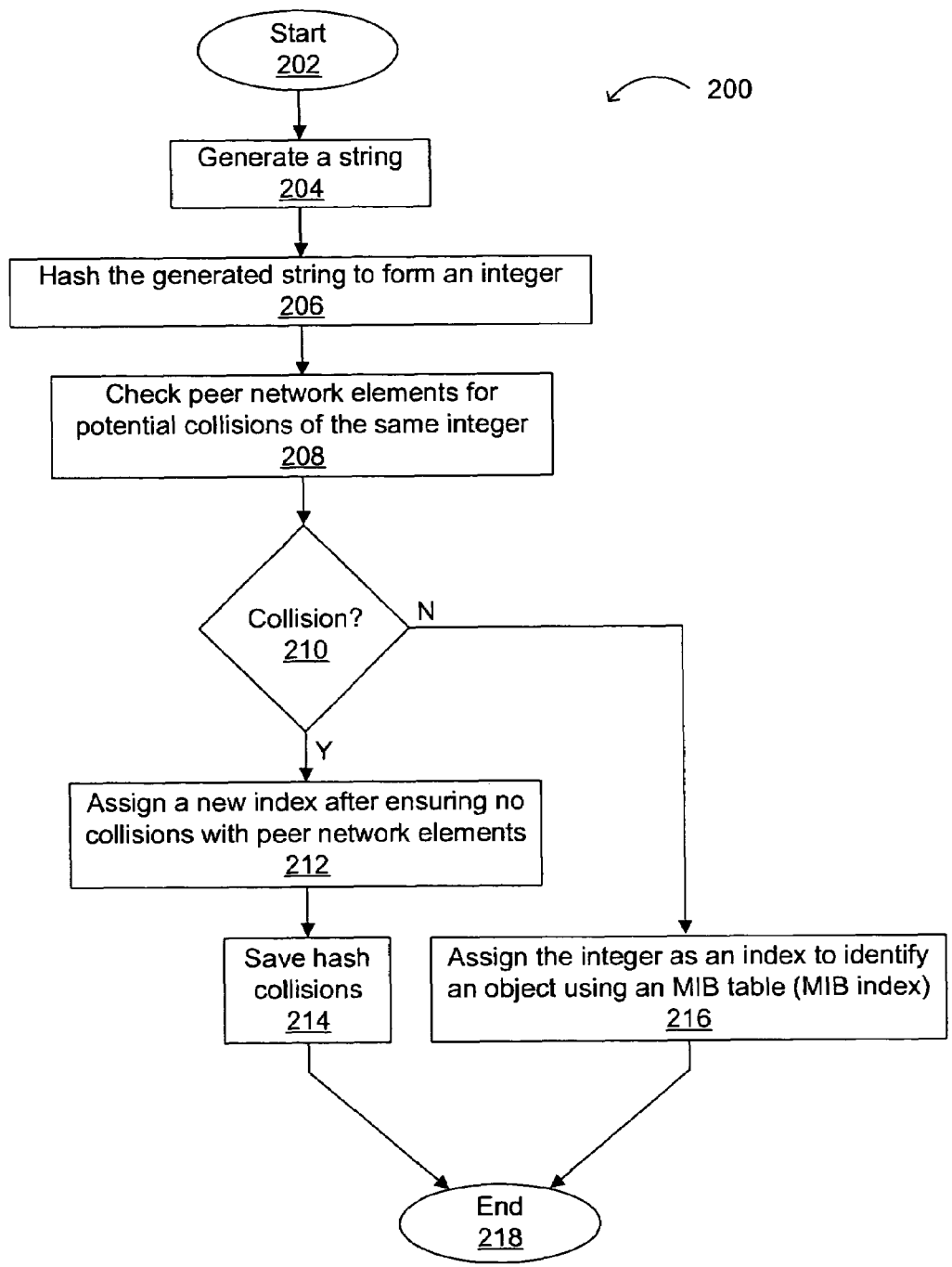
FIG. 2 depicts a flow diagram showing a method of maintaining persistence across network elements in accordance with embodiments of the present invention.

Referring now to FIG. 1, a conventional network element arrangement is indicated by the general reference character 100. Arrangement 100 can include network 102 and customers 108. Customers 108 can include customers 110-0, 110-1, and so on through 110-N. Network 102 can include network devices or elements 106-0, 106-1, and so on through 106-M, as well as Management Information Base (MIB) 104 and Network Management System (NMS) 112. Examples of network elements 106-0, 106-1, . . . 106-M can include routers, printers, hubs, access servers, switches, bridges, storage devices, and/or computer hosts. MIB 104 may be a database used for managing network elements 106-0, 106-1, . . . 106-M, for example. Further, customers 108 may interact with network 102. Of course, as one skilled in the art will recognize, the number of or particular arrangements of network elements and/or customers can vary in accordance with embodiments.

Examples of network 102 can include Local Area Networks (LANs), Wide Area Networks (WANs), Metropolitan Area Networks (MANs), Personal Area Networks (PANs), the Internet, and the Ethernet, for example. Further, network 102 can have various network topologies, such as mesh, star, ring, and bus topologies, to name a few examples.

Network elements 106-0, 106-1, . . . 106-M may direct the traffic of network 102. Thus, data packets may be forwarded within network 102. The data packets can include blocks of data that include information for delivering data to a destination, for example. Also, the transfer and/or forwarding of the data packets can occur at a network layer in an Open Systems Interconnection (OSI) seven-layer model. MIB 104 can include the status information about network elements 106-0, 106-1, . . . 106-M. MIB 104 can also include a chain of indexes in the form of reference tables. These reference tables can include Quality of Service (QoS) configuration and/or statistics.

A management entity, such as NMS 112, can manage network elements 106-0, 106-1, . . . 106-M, via MIB 104 using Simple Network Management Protocol (SNMP), for example. The SNMP is an application layer protocol that facilitates the exchange of information between, as well as the monitoring of, network elements 106-0, 106-1, . . . 106-M. Variations of SNMP include SNMP version 1 and SNMP version 2. Generally, MIB 104 can receive status information from network elements 106-0, 106-1, . . . 106-M, and such status information may also include the configuration of the QoS, for example.

Typically, the persistence of MIB table indexes has been problematic for network element reloads. To prevent such issues, costly extra checking of the index allocations may be performed by a network management system (e.g., NMS 112). Alternatively, the index persistence may be performed by saving the index allocations in a non-volatile random-access memory (NVRAM) on the network element (e.g., 106-0, 106-1, . . . 106-M) itself, whereby the saved data can then be retrieved and repopulated after network element reloading. For example, even if a defined standard does not impose a particular persistence, this persistence may nonetheless be implemented in the network elements. Such persistence examples include the Event MIB, the Expression MIB, and the Circuit Interface MIB. However, storage space limitations in associated NVRAM devices may prohibit the saving of all such persistent data.

In accordance with embodiments of the present invention, a hash algorithm can be used on a network element configuration string such that the hash value provided can be supplied as an MIB index for use in an SNMP, for example. A method and system of reducing synchronization of data in a network using such a hash function approach is described in U.S. patent application Ser. No. 11/429,056, filed on May 4, 2006, which is incorporated herein by reference in its entirety.

Such a method may be performed in a High System Availability (HSA) mode, thus reducing a necessary transfer of object identifiers (OIDs) to achieve Stateful Switch Over (SSO). For example, such a method can involve generation of a string based on the configuration of a Modular Quality of Service (QoSMQC). The generated configuration string may then be hashed to form an integer, which may uniquely represent an OID in the QoSMQC. Further, the OID may be utilized to index the configuration of the QoSMQC in an MIB. In addition, the configuration of the QoSMQC and Class Based Quality of Service Management Information Base (CBQoSMIB) OIDs are correlated. Thus, hashing of identical strings (e.g., on active and standby sides of a network device) leads to a corresponding generation of identical OIDs. Consequently, the need for synchronization of the data (e.g., between active and standby device sides) may be significantly reduced.

Using a hash function to generate an integer or hash value can be done using the configuration string, or by using a string entered using a Command Line Interface (CLI) configuration, for example. This hash value can be used as an index in an SNMP MIB table. If a different string generates a hash value that is already used, that can indicate a hash collision. In such a situation, another index or a new value may be generated for the new string. The persistence can be offered by saving such hash collisions into the NVRAM. However, persistence problems may still exist as to MIB indexes across multiple network elements in a network arrangement, regardless of the configuration order.

In one aspect of embodiments of the present invention, a method for reducing synchronization of data may be performed in HSA mode, as well as Non-High System Availability (NHSA) mode. The HSA mode can include an active side and a standby side. During hardware and/or configuration failure, the standby side can assume control of the functions of the active side. Therefore, associated data may be transferred using SSO from the active side to the standby side. As a result, the system may not remain in a failed state for a very long time, thereby increasing the system availability and providing uninterrupted flow. However, for NHSA mode, the SSO may not be performed from the active side to the standby side, thus leading to relatively low system availability.

In another aspect of embodiments of the present invention, a generated string can be hashed in HSA mode to form an integer, where the integer can represent an HSA object identifier (OID). The OID can be derived identically in both the active side and the standby side, thus substantially reducing any need to synchronize the data. Further, a collision-handling mechanism may also be provided. During reconfiguration of network elements 106-0, 106-1, . . . 106-M, the configuration may be read from an associated NVRAM. When the strings are hashed, collisions may occur in the network elements in a different order prior to the reconfiguration. Therefore, two different hashed strings can lead to the generation of a same integer value that can subsequently lead to corruption of associated data.

In a collision-handling mechanism suitable for use in accordance with embodiments, a global counter file may be saved and synchronized between the active side and the standby side. Subsequently, the global counter file may be checked for each string collision. As a result, the encumbrance of collisions on system performance under this approach may be relatively small, as compared to storing the entire MIB 104 in an associated NVRAM. As one skilled in the art will recognize, other collision-handling mechanisms can also be used in accordance with embodiments of the present invention.

In yet another aspect of embodiments of the present invention, methods for reducing synchronization of data in network 102 can also be utilized to trace the data. This may be achieved on the basis of an integer, which can be generated by hashing the configuration string, as discussed above. Such a generated integer is typically unique in nature and can represent an OID which, in turn, can be utilized to trace the data.

Further, in another aspect of embodiments of the present invention, reducing synchronization of the data can be performed in an Interface Management Information Base (IF-MIB). The IF-MIB is a Management Information Base for various network interfaces. As such, methods for reducing synchronization of the data can be applied to multiple interfaces and/or multiple devices.

In another aspect of embodiments of the present invention, reducing synchronization of the data may be performed in network storage systems. The network storage systems can utilize a unique index value to share the data among themselves. Utilization of such a unique index value can facilitate maintaining persistency of the data across the network storage systems. Further, this approach helps in reducing the amount of the data to be communicated across the network storage systems.

Referring now to FIG. 2, a flow diagram showing a method of maintaining persistence across network elements in accordance with embodiments of the present invention is indicated by the general reference character 200. The flow can begin (202) and a string may be generated (204). The string may be generated based on a configuration in one of network elements 106-0, 106-1, . . . 106-M, of FIG. 1, for example. The configuration of the network element may be accessed through a Modular Quality of Service Command Line Interface (MQC CLI), for example. The generation of the string based on the configuration of the network element can be in accordance with any suitable approach.

It may be necessary to use enough unique configuration information in order to represent data for synchronization to a desired degree of accuracy. Depending on the particular application, any appropriate selection of configuration information may be used to efficiently represent any amount or type of data. For example, an index in an MIB, direction of policy applied (e.g., input or output), configuration text, previously hashed values, port number, IP address, memory location, device identifier, digital signature, and/or other information, can be used to generate a string in accordance with embodiments of the present invention.

Next, the generated string may be hashed to form an integer (206). Next, peer network elements can be checked for potential collisions of the same integer (208). If there is no such collision (210), the integer can be assigned as an index to identify an object using an MIB table, or MIB index (216), as discussed above, and the flow can complete (218). However, if there is a collision found in the peer group (210), a new index can be assigned after ensuring no other collisions with peer network elements (212). Next, such hash collisions can be saved (e.g., to an associated NVRAM) (214) and the flow can complete (218).

In one aspect of embodiments, the identified object (OID) utilized for synchronization between network elements 106-0, 106-1, . . . 106-M, can include a database entry. The identified object may help to link the data in the database entry for quick scanning. In another aspect of embodiments, the OID can include a verification value. The verification value may be utilized to perform Cyclic Redundancy Check (CRC) and/or to create encryption values for verifying software builds.

In another aspect of embodiments, the OID may be utilized to communicate the data between network elements 106-0, 106-1, . . . 106-M, for example. The integer formed after hashing (e.g., 206) may be used as an index for communicating data. Such a utilization of the index to communicate the data across network elements 106-0, 106-1, . . . 106-M, can maintain index persistency in MIB during reload and/or reconfiguration operations.

In another aspect of embodiments, the OID can include an object identifier in a QoS operation. The QoS refers to the capability of a network to provide better services to selected network traffic over various technologies. Examples of such various technologies include Frame Relay, Asynchronous Transfer Mode (ATM), SONET, the Ethernet (such as Regular, Fast, Gigabyte), Serial-Frame relay, etc. The QoS allows configuration of the network traffic in a network (e.g., network 102 of FIG. 1), and may be a Modular Quality of Service (QoSMQC), for example.

In accordance with embodiments of the present invention, each network element may assign a result of a hash function to an MIB index. However, first the network element may check with its peers regarding a potential collision of the same hash value. If no such collision is found, the result of the hash function may be assigned as an MIB index. However, if a collision is discovered, another index may be assigned, after appropriate checking for no collisions with the peer network elements.

In each network element (e.g., router) in a system, a list of network element peers (i.e., a peer group list) for which the persistence is to be ensured can be configured. Such configuration can be done manually. Alternatively, the list of network element peers could by discovered using an automated or semi-automated process. In any event, such a list may potentially be different per feature and/or service. For example, the CLASS-BASED-QOS-MIB persistence can be maintained on a different list of routers, as compared to the Flexible NetFlow persistence, an IP SLA persistence, etc.

Figure 3:
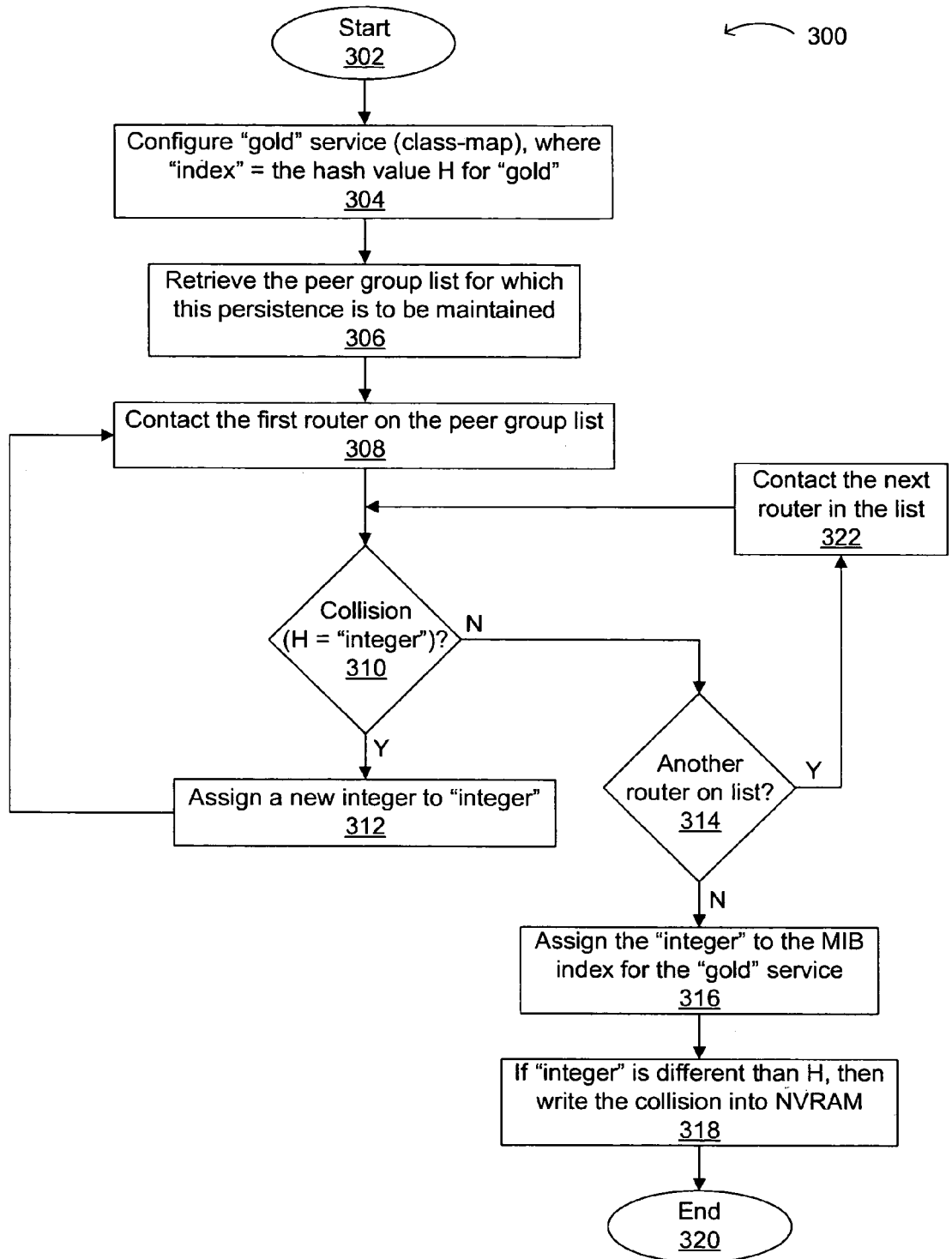
FIG. 3 depicts a flow diagram showing a method of addressing collisions in a peer group in accordance with embodiments of the present invention.

Referring now to FIG. 3, a flow diagram showing a method of addressing collisions in a peer group in accordance with embodiments of the present invention is indicated by the general reference character 300. The flow can begin (302) and a "gold" service (class-map) can be configured, where "index" is the hash value H for "gold" (304). Next, the network element or peer group list for which this persistence is to be maintained can be retrieved (306). As discussed above, configuration of network elements so as to form such a peer group list can be done manually, or the peers could by discovered using an automated or semi-automated process.

The first router on the peer group list can be contacted (308) and a collision check can be performed (310). Such a collision check can include determination of whether there is a class-map on the remote router for which H is "integer," but the name is not "gold," for example. If there is a collision found, a new integer or value can be assigned to "integer" (312) and the flow can return to box 308. Alternatively, by requesting from the neighbor the class-map name for which the hash value is H (but not "gold"), one could directly ensure that the newly-assigned index or value does not collide in box 312, thus eliminating the need to re-check for a collision, as is shown by the flow returning to box 308 from box 312.

If there is no collision (310), but there is another router on the peer group list (314), the next router in the list can be contacted (322), and the flow can continue, as shown. However, if there are no other routers on the peer group list (314), the "integer" can be assigned to the MIB index for the "gold" service (316). Next, if "integer" is different than H, then the collision can be written into an associated NVRAM (318) and the flow can complete (320). Alternatively, hash collisions may be saved to other media, such as Universal Serial Bus (USB), Trivial File Transfer Protocol (TFTP) server, or to other storage devices or the like.

Also, the transport protocol used to contact router or network element peers in the peer group for persistence may be a design choice depending on the particular application. For example, Stream Control Transmission Protocol (SCTP) or User Datagram Protocol (UDP) could alternatively be used. While the SCTP may essentially move some of the complexity into the transport protocol, UDP may be relatively simple. One advantage of using SCTP is that the association is up substantially all the time (costing extra processing and memory resource consumption), except in cases of routing issues and/or remote router down. On the other hand, UDP may not be aware if a remote router were down and may keep re-sending messages as a result.

A notification to the NMS (e.g., 112 of FIG. 1) may also be sent where unresolved conflicts exist. For example, if a router is down for a period of time, during which new configuration has been applied in the network (e.g., 102 of FIG. 1), when the router comes back up, after checking for persistence, collisions may be discovered. In such a situation, a notification can be sent to the fault management system and a corrective action (e.g., deleting or reassigning the SNMP indexes) can be executed. Further, the process of assigning a new MIB index (while checking with remote devices or elements) could be done using a relatively low priority process, as opposed to waiting for a next available high or normal priority process.

In this fashion, MIB persistence can be maintained across multiple network elements for cases of string configuration matching to an SNMP MIB table index, regardless of the configuration order. This approach can substantially simplify and reduce NMS costs arising from checking for index assignments after the re-initialization of an SNMP agent.

Although the invention has been described with respect to specific embodiments thereof, these embodiments are merely illustrative, and not restrictive of the invention. For example, other types of networks, network elements, protocols, and/or network management approaches could be used in accordance with embodiments of the present invention. Further, approaches in accordance with embodiments of the present invention can be used to synchronize and/or check the existence of any string-to-hash conversion, such as a user name to user ID conversion, or whereby such a hashing mechanism can be utilized for the managing and/or sharing of network storage devices, for example.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store, the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components and/or circuits can be used. Also, communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for maintaining persistence across a plurality of network elements in a peer group, the method comprising:
   configuring a network element in the peer group, and generating a configuration string therefrom to represent the network element configuration, wherein the network element is operable to transfer data from an active side to a standby side using stateflil switch over (SSO) during a high system availability (HSA) mode;
   performing a hashing algorithm in the network element using the configuration string as a hash key that is input to the hashing algorithm, wherein a hash value is provided therefrom as an output of the hashing algorithm, the hash value being derived in both the active and standby sides for the HSA mode;
   determining if any collisions exists between the hash value from the network element and corresponding values from among the peer group of network elements by checking with each member of the peer group and comparing the hash value against each corresponding value;
   assigning the hash value as a management table index in the network element when no collision is found; and
   assigning a new value for the management table index in the network element when a collision is found, wherein the new value is stored on the network element for subsequent retrieval, the management table index being persisted in the network element to locate the data for transfer from the active side to the standby side during the HSA mode.

2. The method of claim 1, further comprising saving the new value for the management table index to a non-volatile random-access memory (NVRAM) on the network element.

3. The method of claim 1, further comprising configuring a service for one or more of the network elements in the peer group, and providing the hash value on the network element therefrom.

4. The method of claim 1, wherein the determining if any collisions comprises retrieving a peer group list on the network element, the peer group list including at least two of the plurality of network elements.

5. The method of claim 4, wherein the checking with each member of the peer group comprises contacting each network element in the peer group list.

6. The method of claim 1, wherein the management table index comprises a management information base (MIB) index for simple network management protocol (SNMP).

7. The method of claim 1, wherein the determining if any collisions exist comprises using a transport protocol.

8. An apparatus for managing a distributed management table for a plurality of network elements in a peer group, the apparatus comprising:
   a processor;
   a hash table coupled to receive a configuration string from a network element and to provide a hash value in response to the configuration string, the configuration string representing a configuration of the network element, wherein the network element is operable to transfer data from an active side to a standby side using stateful switch over (SSO) during a high system availability (HSA) mode, the hash value being derived in both the active and standby sides for the HSA mode; and
   logic encoded in a tangible media for execution by the processor, and when executed operable to:
      determine if any collisions exists between the hash value from the network element and corresponding values from among the peer group of network elements by checking with each member of the peer group and comparing the hash value against each corresponding value;
      assign the hash value as an index for the distributed management table when no collision is found; and
      assign a new value for the index for the distributed management table when a collision is found, wherein the new value is stored on the network element for subsequent retrieval, the management table index being persisted in the network element to locate the data for transfer from the active side to the standby side during the HSA mode.

9. The apparatus of claim 8, further comprising a non-volatile random-access memory (N VRAM) configured to store the new value.

10. The apparatus of claim 8, wherein the logic when executed that is operable to determine if any collisions exist supports a transport protocol.

11. The apparatus of claim 8, further comprising logic when executed that is operable to arrange a service for one or more of the plurality of network elements, and to provide the hash value therefrom.

12. The apparatus of claim 8, further comprising logic when executed that is operable to retrieve a peer group list, the peer group list including at least two of the plurality of network elements.

13. The apparatus of claim 12, further comprising logic when executed that is operable to contact each network element retrieved from the peer group list for the checking with each member of the peer group.

14. A system for maintaining persistence across a plurality of network elements in a peer group, the system comprising:
   means of at least one processor operably coupled to at least one storage medium;
   means for configuring a network element in the peer group, and generating a configuration string therefrom to represent the network element configuration, wherein the network element is operable to transfer data from an active side to a standby side using stateful switch over (SSO) during a high system availability (HSA) mode;
   means for performing a hashing algorithm in the network element using the configuration string as a hash key that is input to the hashing algorithm, wherein a hash value is provided therefrom as an output of the hashing algorithm, the hash value being derived in both the active and standby sides for the HSA mode;
   means for determining if any collisions exists between the hash value from the network element and corresponding values from among the peer group of network elements by checking with each member of the peer group and comparing the hash value against each corresponding value;
   means for assigning the hash value as a management table index in the network element when no collision is found; and
   means for assigning a new value for the management table index in the network element when a collision is found, wherein the new value is stored on the network element for subsequent retrieval, the management table index being persisted in the network element to locate the data for transfer from the active side to the standby side during the HSA mode.

15. A computer-readable storage medium on which is stored a sequence of instructions that, when executed by one or more processors, causes the processors to perform the method of:
   configuring a network element in a peer group, and generating a configuration string therefrom to represent the network element configuration, wherein the network element is operable to transfer data from an active side to a standby side using stateful switch over (SSO) during a high system availability (HSA) mode;
   performing a hashing algorithm in the network element using the configuration string as a hash key that is input to the hashing algorithm, wherein a hash value is provided therefrom as an output of the hashing algorithm, the hash value being derived in both the active and standby sides for the HSA mode;
   determining if any collisions exists between the hash value from the network element and corresponding values from among the peer group of network elements by checking with each member of the peer group and comparing the hash value against each corresponding value;
   assigning the hash value as a management table index in the network element when no collision is found; and
   assigning a new value for the management table index in the network element when a collision is found, wherein the new value is stored on the network element for subsequent retrieval, the management table index being persisted in the network element to locate the data for transfer from the active side to the standby side during the HSA mode.

16. The computer-readable medium of claim 15, wherein the method further comprises configuring a service for one or more of the plurality of network elements, and providing the hash value therefrom.

17. The computer-readable medium of claim 15, wherein the checking with each member of the peer group further comprises retrieving a peer group list, the peer group list including at least two of the plurality of network elements.

18. The computer-readable medium of claim 17, wherein the checking with each member of the peer group further comprises contacting each network element in the peer group list.

19. The computer-readable medium of claim 15, wherein the management table index comprises a management information base (MIB) index for simple network management protocol (SNMP).

20. The computer-readable medium of claim 15, wherein the determining if any collisions exist comprises using a transport protocol.

* * * * *